United States Patent
Janeke

(10) Patent No.: US 7,344,111 B2
(45) Date of Patent: Mar. 18, 2008

(54) REVERSIBLE SPACE PLANE

(76) Inventor: Charl E. Janeke, Janeku & Cumming, 1330 Ingraham, #114, Los Angeles, CA (US) 90017

( * ) Notice: Subject to any disclaimer, the term of this patent is extended or adjusted under 35 U.S.C. 154(b) by 407 days.

(21) Appl. No.: 11/040,170

(22) Filed: Jan. 21, 2005

(65) Prior Publication Data

US 2006/0006289 A1 Jan. 12, 2006

Related U.S. Application Data

(60) Provisional application No. 60/538,417, filed on Jan. 23, 2004.

(51) Int. Cl.
*B64G 1/00* (2006.01)

(52) U.S. Cl. .............. 244/158.9; 244/172.2; 244/53 B

(58) Field of Classification Search ........... 244/158.1, 244/159.1, 159.3, 158.9, 171.8, 160, 171.7, 244/172.2, 53 B
See application file for complete search history.

(56) References Cited

U.S. PATENT DOCUMENTS

| | | | |
|---|---|---|---|
| 3,098,445 A * | 7/1963 | Jackson | 244/3.28 |
| 3,295,789 A | 1/1967 | Hill | |
| 3,576,298 A * | 4/1971 | Barnett et al. | 244/159.3 |
| 3,602,460 A * | 8/1971 | Whittley et al. | 244/12.4 |
| 3,903,801 A * | 9/1975 | Senoski | 102/348 |
| 4,754,601 A * | 7/1988 | Minovitch | 60/204 |
| 4,896,847 A * | 1/1990 | Gertsch | 244/159.1 |
| 5,115,996 A * | 5/1992 | Moller | 244/12.5 |
| 5,452,866 A * | 9/1995 | Bulman | 244/117 A |
| 5,853,143 A * | 12/1998 | Bradley et al. | 244/3.21 |
| 5,873,549 A * | 2/1999 | Lane et al. | 244/158.9 |
| 6,119,985 A * | 9/2000 | Clapp et al. | 244/171.4 |
| 6,608,463 B1 * | 8/2003 | Kelly et al. | 320/101 |
| 6,918,244 B2 * | 7/2005 | Dickau | 60/229 |
| 6,921,596 B2 * | 7/2005 | Kelly et al. | 429/17 |
| 2003/0085319 A1 * | 5/2003 | Wagner et al. | 244/12.3 |
| 2004/0026572 A1 * | 2/2004 | Burton | 244/172 |

OTHER PUBLICATIONS

International Search Report and Written Opinion issued on corresponding PCT Application No. PCT/US05/01763; dated Sep. 1, 2006; 10 pages.

* cited by examiner

*Primary Examiner*—Teri Pham Luu
*Assistant Examiner*—Joseph W Sanderson
(74) *Attorney, Agent, or Firm*—Osha Liang LLP

(57) ABSTRACT

A reversible aerospace plane includes an air intake at a first end of the aerospace plane, at least one heat exchanger disposed in the aerospace plane, an engine at a second end of the aerospace plane, wherein the aerospace plane is configured to accelerate in a first direction and configured to glide and land in a second direction, wherein the second direction is substantially in a reverse direction from the first direction.

18 Claims, 4 Drawing Sheets

REVERSIBLE SPACE PLANE

CROSS-REFERENCE TO RELATED APPLICATIONS

This application claims the priority from U.S. Provisional Application No. 60/538,417 filed on Jan. 23, 2004. This Provisional Application is incorporated by reference in its entirety.

BACKGROUND OF INVENTION

The loss of the space shuttle Columbia in 2003 highlights a need for a safer reusable single-stage-to-orbit ("SSTO"). The Columbia included a payload during re-entry, which was not typical for such re-entries. In addition to the mass of the payload, problems with the tiled heat shield led to the catastrophic loss of the Columbia. Due to the shuttle's relatively small footprint, structural weight, and rapid decent into the atmosphere, it dissipates most of the kinetic energy of orbital velocity in the denser atmosphere, relying exclusively on the heat shield to remain intact. Because of the need to clear the atmosphere relatively quickly and reliance on boosters, the NASA space shuttle evolved into a daunting behemoth that is very costly to assemble and launch.

U.S. Pat. No. 5,191,761 ("the '761 patent"), owned by the applicant for the present invention, discloses an air breathing aerospace engine. That patent is incorporated by reference in its entirety. The engine includes a frontal core that houses an oxygen liquefaction system that captures ambient air and liquefies and separates the oxygen. The oxygen may then be used in the rocket engine.

U.S. Pat. No. 6,213,431 ("the '431 patent") owned by the applicant for the present invention, discloses an aerospike engine. That patent is incorporated by reference in its entirety. An aerospike engine may have a tapered body with a slanted or curved reaction plane. A fuel injector directs fuel down the reaction plane. The combustion of the fuel on the reaction plane creates a propulsive force across the reaction plane.

What is needed, therefore, is a reversible re-usable SSTO vehicle that may be expediently launched to service the rapidly expanding space enterprise. A reduction in cost as well as an improvement in payload capacity are also desires of this growing industry.

SUMMARY OF INVENTION

In one aspect, the invention relates to a reversible aerospace plane that includes an air intake at a first end of the aerospace plane, at least one heat exchanger disposed in the aerospace plane, and an engine at a second end of the aerospace plane, wherein the aerospace plane is configured to accelerate in a first direction and configured to glide and land in a second direction, wherein the second direction is substantially in a reverse direction from the first direction.

In another aspect, the invention relates to a method of flying an aerospace plane that includes accelerating to an orbital velocity in a first direction, re-orienting the aerospace plane, and re-entering an atmosphere in a second direction, wherein the second direction is substantially in an opposite direction from the first direction.

Other aspects and advantages of the invention will be apparent from the following description and the appended claims.

DETAILED DESCRIPTION

An aerospace plane in accordance with one or more embodiments of the invention may be a reversible aerospace plane. The aerospace plane may include an air liquefaction system that enable the aerospace plane to travel at hypersonic velocities in the atmosphere with reduced drag. When operated in the reverse direction, the aerospace plane may exhibit a larger drag so that the kinetic energy from an orbital velocity may be dissipated at a higher altitude and over a longer time period that conventional vehicles.

Figure 1:
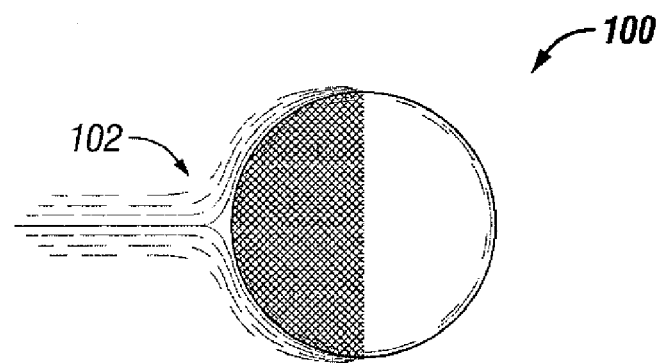
FIG. 1 shows a view of an ideal sphere moving at supersonic velocity.

FIG. 1 shows the ideal situation of a sphere 100 moving at hypersonic velocity through the atmosphere. The surface 102 of the front half of the sphere 100 is an ideal condenser that will condense the incident air to a liquid upon contact with the surface 102. In this ideal model, instead of creating a shockwave in the atmosphere, the sphere 100 condenses the air, thereby creating a partial vacuum in front of the sphere 100. The effect of this condensation of air is to reduce the drag experienced by the sphere 100 to zero. The sphere can move at an unlimited speed through the atmosphere, without creating drag. This principle may be applied to the present invention to enable hypersonic velocity at previously unattainable speeds.

Figure 2:
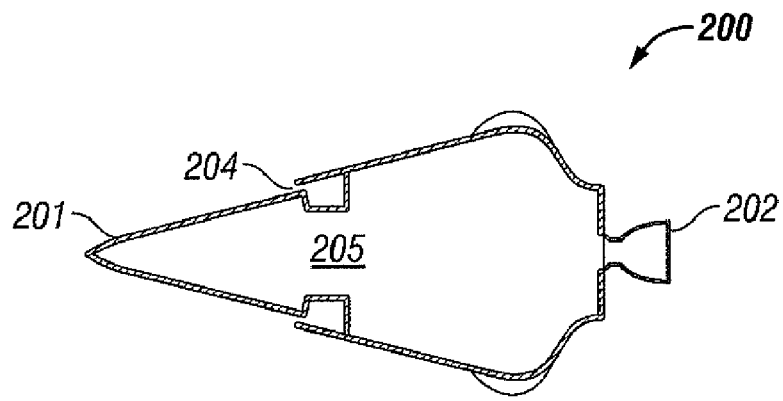
FIG. 2 shows a cross section of an embodiment of an aerospace plane in accordance with one embodiment of the invention.

FIG. 2 shows a cross section of an aerospace plane 200 in accordance with one embodiment of the invention. The aerospace plane includes a nose cone 201 at the front and a bell rocket engine 202 at the rear. An air intake 204 allows air to flow into the aerospace plane 200 as it moves through the atmosphere. The air enters a heat exchanger portion 205 of the aerospace plane 200.

Figure 3:
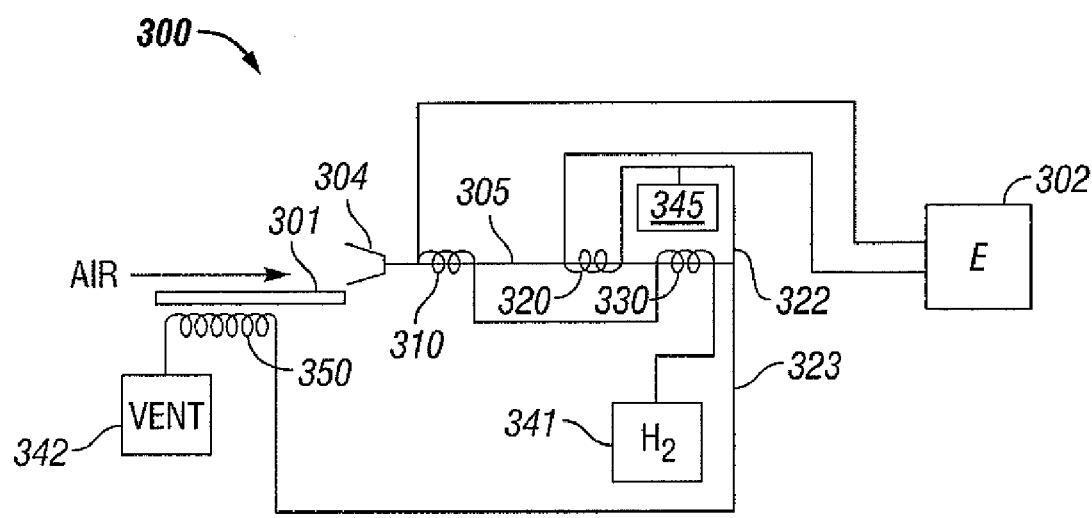
FIG. 3 shows a schematic of a cooling/condensing system in accordance with one embodiment of the invention.

FIG. 3 is a schematic of a heat exchanger system 300 in accordance with one embodiment of the invention. Reference may be made to FIG. 2 as well, to show the respective location of the components in this particular embodiments.

Air that is incident on the nose cone 301 (201 in FIG. 2) is cooled by a cooling fluid in the nose cone 301. For a conventional aircraft, the air that is incident upon the front of the aircraft as it moves through the atmosphere is compressed adiabatically. That is, the compression occurs without substantial heat transfer. As a result, the incident air increases in temperature. By cooling the air that is incident on the nose cone 301, the compression may be an isothermal compression. That is, heat is absorbed from the incident air so that it is compressed without a significant increase in temperature.

Generally, isothermal compression requires less energy that a similar adiabatic compression. Because of the lower energy requirement, there is less drag on the aerospace plane (200 in FIG. 2) as it travels through the atmosphere.

It is noted, however, that in practice, the incident air may experience an increase in temperature. For example, incident air, which may have a temperature close to 0° F. at altitude, may be heated to over 1,500° F. because of drag for a conventional aircraft traveling at about Mach 5. Precooling the air, as will be described, may result in the incident air being heated to only 500° F. Thus, the compression process with precooling more closely approaches the isothermal ideal.

The precooling of the air before it flows through the intake (204 in FIG. 2) may be done using nitrogen gas (or liquid) separated from the incident air, as will be described. A heat exchanger 350 in the nose cone 301 may be used to precool the air.

Upon flowing into the air intake 304 (204 in FIG. 2), the incident air enters a heat exchanger/condenser portion (205 in FIG. 2) of the aerospace plane. In the embodiment shown in FIG. 3, the incident air is cooled and condensed in three stages, 310, 320, 330. More or less than three stages may be used without departing from the scope of the present invention.

An aerospace plane in accordance with the invention may include a hydrogen tank 341 for storing an amount of hydrogen that is necessary for propulsion. The hydrogen it typically stored in liquid form, and therefore, must be kept below −423° F., the boiling point of hydrogen. This liquid hydrogen must be evaporated before it may be used as a propellant in the engine 302. To evaporate the hydrogen, it is convenient to flow the hydrogen through heat exchangers (e.g., 310, 330 in FIG. 3) so that cooling an condensing of the incident air may be accomplished at the same time.

As shown in FIG. 3, hydrogen from the hydrogen storage tank 341 is pumped through the third stage heat exchanger 330, where the low temperature and the heat of vaporization are used to condense the incident. As will be discussed later, in some embodiments, only the oxygen from the incident air is liquefied.

Hydrogen has a specific heat of 3.425 BTU/lb-° F. and a heat of vaporization of 191.7 BTU/lb. Oxygen, on the other hand, has a specific heat of 0.219 BTU/lb-° F. and a heat of vaporization of 91.7 BTU/lb. The greater values for hydrogen provide an advantage in cooling and condensing the oxygen.

Following the third stage, the hydrogen, typically in gaseous form, flows to the first stage 310, where it is used to continue the cooling process of the incident air following precooling from the nose cone 301. The hydrogen may then be pumped to the engine for use as a propellant or fuel.

The incident air, following the precooling at the nose cone 301, flows through the air intake 304 (204 in FIG. 2) and into the first stage heat exchanger 310. In the first stage 310, the air cooled, and the energy from the air is used to heat the hydrogen to an appropriate temperature for combustion in the engine.

The cooling of the incident air continues in the second stage heat exchanger 320. In the embodiment shown in FIG. 3, the coolant in the second stage 320 is liquid oxygen, which may be from an oxygen tank 345 or it may be the liquefied oxygen that results from the condensation of the oxygen in the air in the third stage 330.

In the third stage 330, at least a portion of the oxygen in the air is liquefied by giving up energy to the liquid hydrogen coolant in the third stage 330. Air is mostly comprised of oxygen (about 20%) and nitrogen (about 80%). The boiling point of oxygen (i.e., the temperature, at 1 ATM, below which oxygen is a liquid) is −180° F. and the boiling point of nitrogen is −230° F. This difference enables the condensation of some or all of the oxygen in the incident air, without liquefying any of the nitrogen in the incident air.

It is noted that the invention does not preclude the liquefaction of nitrogen in the incident air. However, there may be certain advantages to liquefying only the oxygen in the incident air. For example, cooling potential needed to liquefy the nitrogen may be saved and used for other purposes, such as tanking additional oxygen. Also, liquefying the nitrogen in the incident air would require larger and more massive heat exchangers, which may adversely affect the available payload. In addition, the cooled nitrogen gas may be used for cooling purposes, as will be described.

Following the third stage 330, the incident air may be separated into an oxygen component and a nitrogen component. The nitrogen component, shown at 323, may flow to the precooler heat exchanger 350 in the nose cone 301 of the aerospace plane. The oxygen component may flow to the second stage heat exchanger 320, where in may be evaporated into gas for use in the engine 302. Additionally, the liquid oxygen from the incident air may be pumped to a storage tank 345 for storage and later use—for example, it may stored for use in space, where there is no atmosphere to provide incident air.

Liquefying oxygen from the atmosphere during flight presents numerous advantages. First, collecting and liquefying oxygen during flight greatly reduces the amount of tanked liquid oxygen that must be stored on-board before lift off. A non-air breathing rocket must carry all of the oxygen that will be used during the entire flight. This represents a significant mass. The hydrogen combustion reaction with oxygen requires 2 moles of hydrogen for every mole of oxygen ($H_2O$ has two hydrogen atoms for every atom of oxygen). But because oxygen is 16 times heavier than hydrogen, the required oxygen has 8 times the mass of the required hydrogen. In an air-breathing rocket, the oxygen may be distilled from the atmosphere, thus saving a substantial amount of mass.

Appendix A to this application includes two tables showing the amount of pre-launch mass, including fuel and oxygen, that is required to propel one pound of payload into orbit. The fuel in this case is hydrogen. The two cases are for a non-air breathing aerospace plane and an air breathing aerospace plane. Starting with an orbital velocity of 25,000 ft./sec, the chart shows calculations working backwards to zero velocity. In each step, the difference in kinetic energy (DKe) is used to determine the differential masses of the fuel (DH2, DO2) required to achieve the kinetic energy differential. The masses are then cumulatively added to the mass (MM) of the rocket.

The upper chart shows that for a non-air breathing rocket, 9.116 pounds of takeoff weight are required to get 1.000 pounds of payload to an orbital velocity of 25,000 ft./sec. The lower chart represents an air breathing rocket. At velocities below 14,000 ft./sec, which represent flight in the atmosphere, the differential in oxygen mass (DO2) is zero. This is because the oxygen may be condensed from the atmosphere, as described above. The lower chart shows that only 5.183 pounds of takeoff weight is needed to propel 1.000 pound of payload to an orbital velocity of 25,000 ft./sec. For embodiments where a fraction of the liquefied oxygen is tanked for later use, the required takeoff weight may be even lower.

Appendix B shows similar charts for a rocket fueled with methane. A non-air breathing rocket may require 23.941 pounds of takeoff weight to propel 1.000 pound of payload to an orbital velocity of 25,000 ft./sec, where an air breathing rocket may require only 10.572 pounds of takeoff weight.

It is further noted that a hydrogen slush may be tanked, instead of simple liquid hydrogen. A slush includes partially frozen hydrogen that is still able to be pumped. This would increase the cooling capacity of an aerospace plane by as much as 13%, resulting in a payload increase of as much as 10%.

Figure 4A:
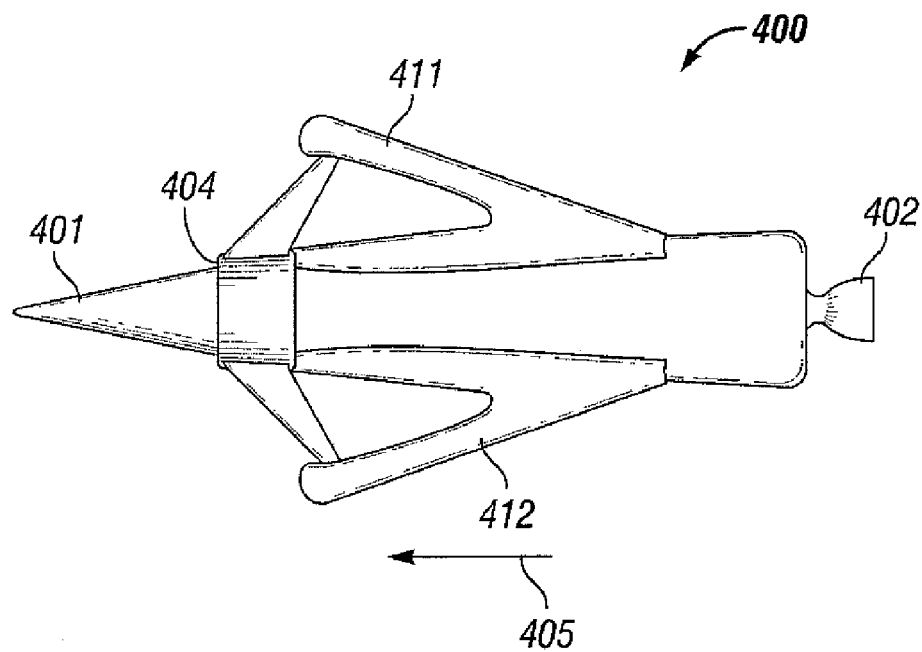
FIG. 4A shows one embodiment of an aerospace plane in accordance with one embodiment of the invention.

FIG. 4A shows a reversible aerospace plane 400 in accordance with one embodiment of the invention. A reversible aerospace plane is one that is capable of takeoff/acceleration in one direction, but deceleration/re-entry and landing in a reverse direction.

The aerospace plane 400 includes a nose cone 401, and air intake 404, and a conventional bell rocket engine 402. In addition, the body of the aerospace plane 400 includes two wings 411, 412. During an acceleration/takeoff mode, the aerospace plane 400 may be propelled by the engine 402 in the direction shown by the arrow 405. In this direction, the wings 411, 412 form a "hyper foil," which is used to mean that they present a small profile to the incident air, and the drag is minimized. The wings 411, 412 may form an air foil so that they will provide lift during atmospheric flight. In addition, lift may be generated by the angle of attack of the aerospace plane 400.

The nose cone 401 and the associated heat exchangers (e.g., 350 in FIG. 3) may be constructed of a light and relatively inexpensive material so that the nose cone 401 may be jettisoned from the aerospace plane 400 before re-entry. During re-entry, the aerospace plane 400 may fly in an opposite direction, and the nose cone would no longer be needed. The constraints of heat exchanger design may require that the nose cone 401 be formed in such a way that it would not be able to withstand the forces and heat of re-entry. In addition, a nose cone may present a hazard or obstruction during landing. Thus, it may be jettisoned from the aerospace plane 400, as will be explained.

The aerospace plane 400 in FIG. 4A may be used with a piggy-back arrangement to gain an initial altitude and airspeed. For example, a larger plane may be used to carry the aerospace plane 400 from the ground to an altitude of 30,000 ft.-50,000 ft. From this point, the bell engine 402 may be engaged to provide the thrust to achieve orbit.

Figure 4B:
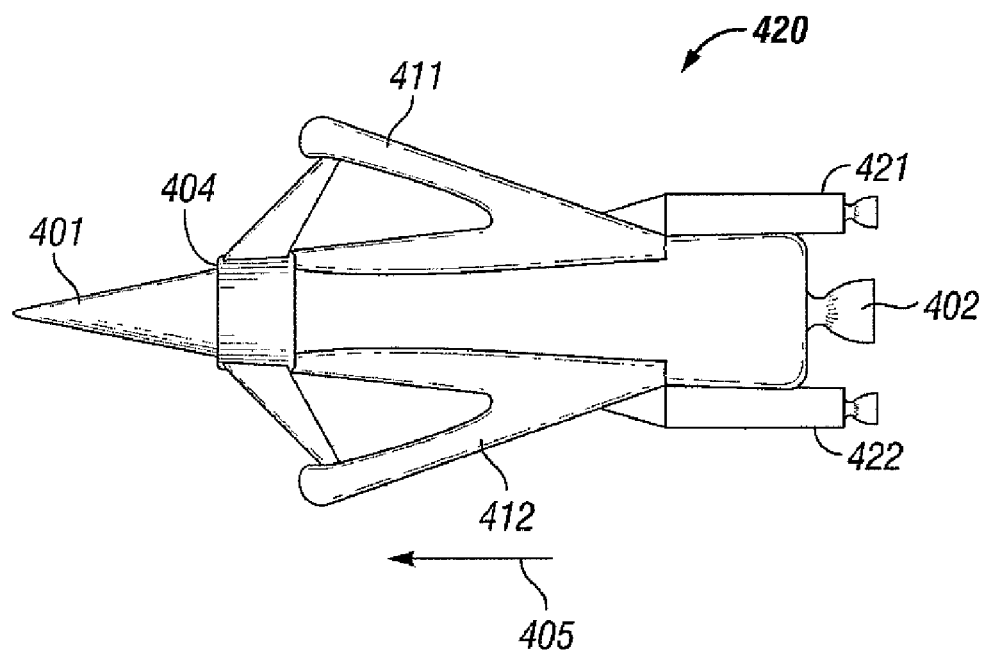
FIG. 4B shows one embodiment of an aerospace plane with boosters in accordance with one embodiment of the invention.

FIG. 4B shows an aerospace plane 420 with solid rocket boosters 421, 422, similar to the boosters that have been used with the NASA space shuttle orbiter. The boosters 421, 422 may be used to provide low altitude thrust for the aerospace plane 420. The boosters 421, 422 may be jettisoned once they have been spent.

Figure 4C:
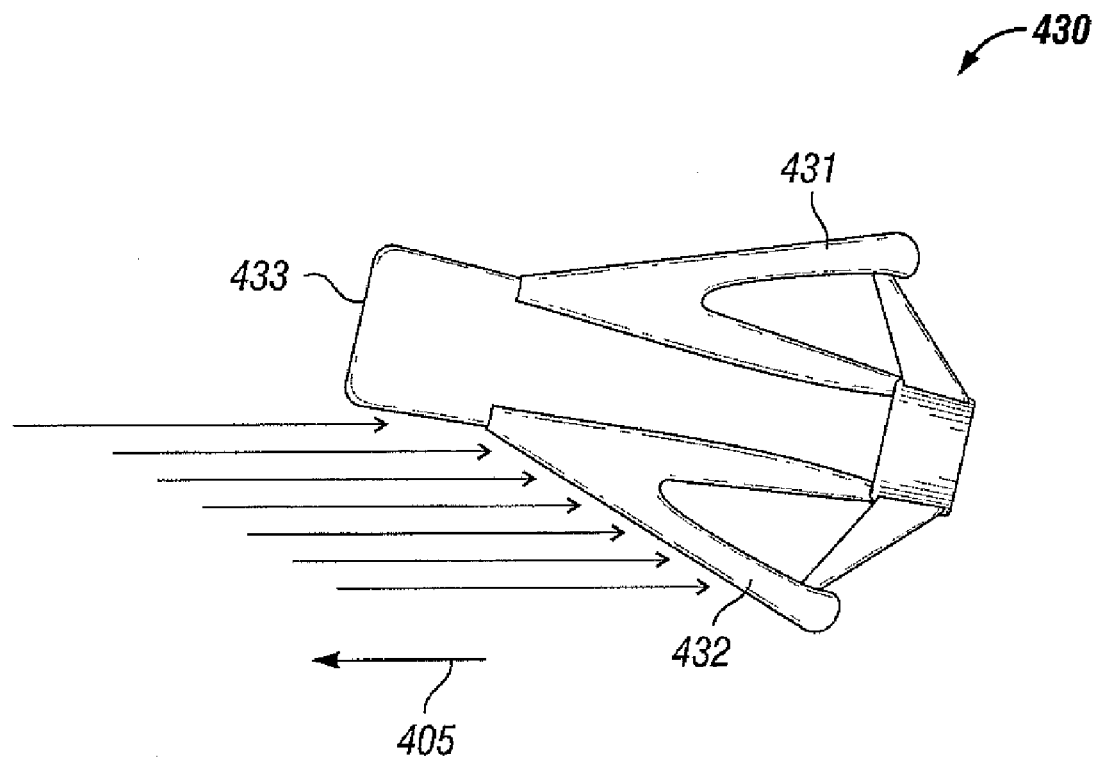
FIG. 4C shows one embodiment of an aerospace plane during re-entry, in accordance with one embodiment of the invention.

FIG. 4C shows one embodiment of an reversible aerospace plane 430 during a re-entry phase. The aerospace plane 430 is flying in a reverse orientation from the aerospace planes 400, 420 shown in FIGS. 4A and 4B. This may be accomplished by simply using orientation thrusters to rotate the aerospace plane 430 180° while in orbit and before re-entry begins. In FIG. 4C, the nose cone (401 in FIG. 4A) has been jettisoned. In addition, at the forward section of the aerospace plane 430 in this mode, the engine (402 in FIG. 4A) has been likewise jettisoned for aerodynamic an control purposes.

The aerospace plane 430 and its wings 431, 432 are formed so that in the reverse direction, they create a "para foil"—that is, they are formed to have rounded edges that present a large profile and create more drag that when the aerospace plane 430 flies in the takeoff direction (e.g., the direction shown in FIG. 4A). As shown in FIG. 4C, the aerospace plane 430 may be pitched upwardly so as to create even more drag.

The drag on the aerospace plane 430 in the reverse direction enables the aerospace plane 430 to dissipate a large amount of kinetic energy in the upper atmosphere, where atmospheric density it low enough that the aerospace plane 430 will not generate temperatures that require sophisticated heat shielding.

For example, the NASA space shuttles will generally re-enter the dense atmosphere at very high speeds. The space shuttle will slow to normal air velocities within about a quarter of a full orbit. For example, when landing in Florida, it is typical for a space shuttle to begin slowing down at a position near Hawaii. The shuttle will then slow down and land in the distance between Hawaii and Florida.

An aerospace plane 430 in accordance with the invention may have a sufficient drag so that slowing down may be accomplished at a much higher altitude and over a longer distance. For example, an aerospace plane 430 may slow from orbital velocity over two complete orbits around the Earth, taking a much longer time. The additional time enables the aerospace plane 430 to dissipate the heat associated with slowing down so that sophisticated heat shielding is not required. Further, the structure and required propellant of such an aerospace plane may enable it to be substantially lighter than previous vehicles. A reduction in mass will also reduce the kinetic energy that must be dissipated during re-entry.

It is noted that an aerospace plane in accordance with the invention may be referred to a traveling in a "reverse direction." In practice, an aerospace plane may be oriented in a reverse situation, even though the vector of travel for the aerospace plane has not itself reversed. The use of "reverse direction" is meant to indicate a reverse orientation of the aerospace plane.

Figure 4D:
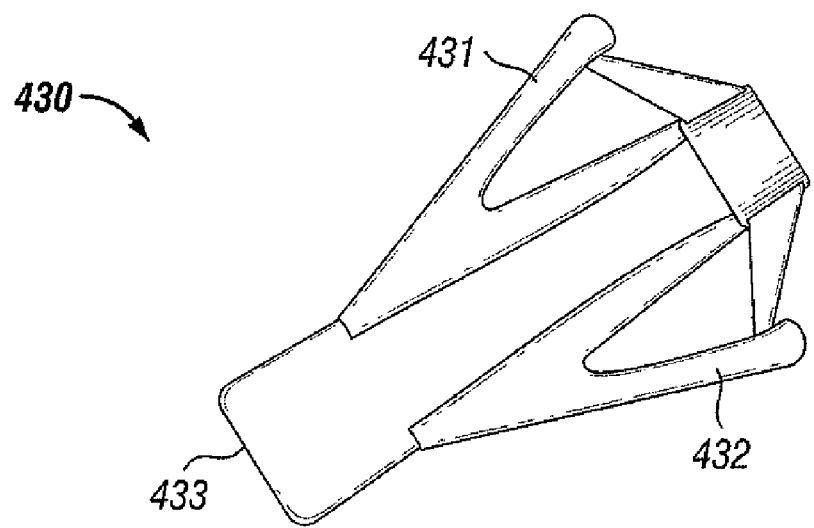
FIG. 4D shows one embodiment of an aerospace plane prepared to land in accordance with one embodiment of the invention.

FIG. 4D shows the aerospace plane 430 in a maneuvering/landing mode. The aerospace plane 430 is pitched downward for gliding, maneuvering, and landing. The wings 431, 432 may form an airfoil to generate lift that will aid in the maneuverability of the aerospace plane 430.

It is also noted that an aerospace plane in accordance with the invention may be manned or unmanned. A remotely controlled aerospace plane may be used while still gaining the advantages of the present invention. A manned aerospace plane is also within the scope of the invention. The reduced temperatures during re-entry provide a significantly safer re-entry phase than with the existing space shuttle design.

Figure 5:
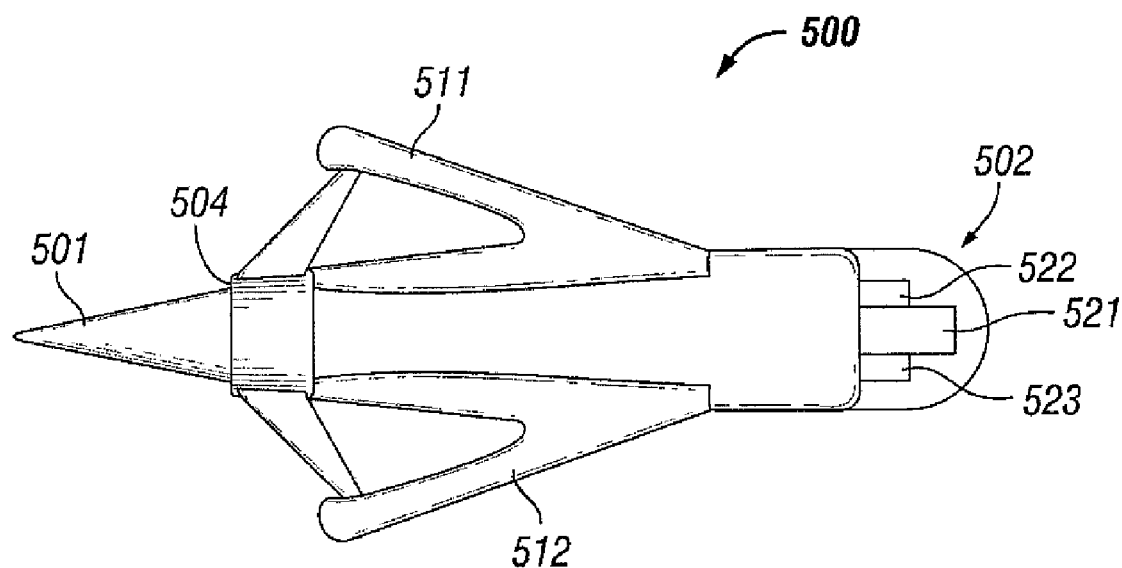
FIG. 5 shows one embodiment of an aerospace plane with an aerospike engine in accordance with one embodiment of the invention.

FIG. 5 shows another embodiment of an aerospace plane 500 in accordance with the invention. The aerospace plane 500 includes a nose cone, and air intake 504, and wings 511, 512, as the embodiment shown in FIG. 4A. The illustrated difference is that the aerospace plane 500 in FIG. 5 includes an aerospike engine 502 instead of a bell nozzle. An asonic aerospike engine is disclosed in U.S. Pat. No. 6,213,413 ("the '413 patent"), which is owned by the applicant for the present invention. That patent is incorporated by reference in its entirety.

The aerospike engine 502 shown in FIG. 5 includes a primary reaction plane 521, and two secondary reaction planes 522, 523. Any arrangement of reaction planes may be devised for an aerospike engine with out departing form the scope of the invention.

As disclosed in the '413 patent, an aerospike engine is able to operate more efficiently than a bell nozzle at a variety of altitudes. Because of this feature, an aerospace plane 500 with an aerospike engine 502 may be able to takeoff on a runway, using the thrust from only the aerospike engine. In this regard, an aerospace plane 500 forms a self-sufficient SSTO vehicle that may takeoff from a runway, achieve an orbital velocity, orbit the Earth, re-enter the Earth's atmosphere in a reverse direction, and land. Advantageously, such a aerospace plane 500 may not require the use of boosters or a piggy-back.

Figure 6:
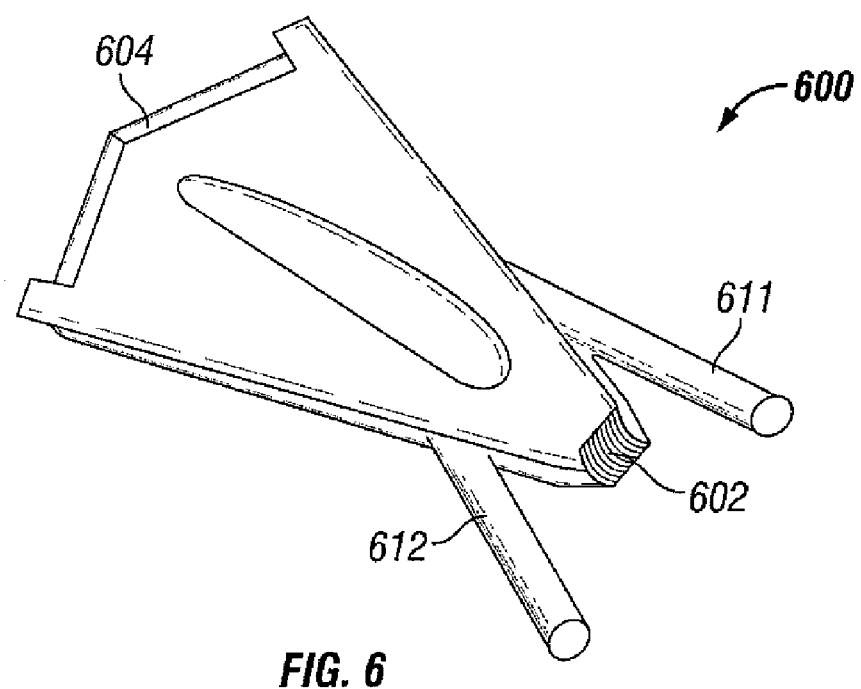
FIG. 6 shows one embodiment of an aerospace plane in accordance with one embodiment of the invention.

FIG. 6 shows another embodiment of an aerospace plane 600 in accordance with the invention. The aerospace plane 600 does not include a nose cone. Instead, the entire aerospace plane forms a wing-type structure, and there is an air intake 604 at a first end of the aerospace plane 600. An engine 602 is located at the other end, and in the embodiment shown in FIG. 6, the engine 602 is an aerospike engine. The aerospace plane 600 is shown with boosters 611, 612 that may be jettisoned. In some embodiments, and aerospace plane 600 does not include boosters. For example, an aerospace plane 600 may include an aerospike engine 602 that enables the aerospace plane 600 to takeoff, fly to orbit, and land without the need for boosters. Additionally, a piggyback may be used.

In a takeoff/acceleration mode, the aerospace plane 600 travels in a first direction 605. Incident air flows into the air intake 604, and is then cooled and condensed, thereby reducing the drag on the aerospace plane 600 at hypersonic velocity. The engine 602 may be used to propel the aerospace plane 600. Upon reaching orbital velocity, the air intake 604 may be closed.

For a re-entry/deceleration/landing mode, the aerospace plane 600 may travel in a reverse direction 606. The engine, which may be a bell nozzle in some embodiments, may be jettisoned. An aerospike engine may adapted to withstand the forces and temperatures of re-entry, or an aerospike engine may be retracted for re-entry.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A reversible aerospace plane, comprising:
   an air intake at a first end of the aerospace plane;
   at least one heat exchanger disposed in the aerospace plane;
   an engine at a second end of the aerospace plane,
   wherein the aerospace plane is configured to accelerate in a first orientation and configured to glide and land in a second orientation, wherein the second orientation is substantially a reverse of the first orientation;
   wherein the at least one heat exchanger comprises:
      a first stage heat exchanger;
      a second stage heat exchanger; and
      a third stage heat exchanger,
      wherein the third stage heat exchanger is configured to use tanked liquid hydrogen as a coolant to condense at least a portion of an oxygen component of an incident air, wherein the second stage heat exchanger is configured to cool the incident air with the liquid oxygen from the third stage heat exchanger, and wherein the first stage heat exchanger is configured to cool the incident air using the hydrogen coolant from the third stage heat exchanger.

2. The reversible aerospace plane of claim 1, further comprising a nose cone at the first end of the aerospace plane.

3. The reversible aerospace plane of claim 2, further comprising a fourth heat exchanger disposed in the nose cone and configured to precool incident air.

4. The reversible aerospace plane of claim 2, wherein the nose cone is configured to be jettisoned before a re-entry.

5. The reversible aerospace plane of claim 1, wherein the engine comprises a bell nozzle engine configured to be jettisoned before a re-entry.

6. The reversible aerospace plane of claim 1, wherein the engine comprises an aerospike engine.

7. A reversible aerospace plane, comprising:
   an air intake at a first end of the aerospace plane;
   at least one heat exchanger disposed in the aerospace plane;
   an engine at a second end of the aerospace plane,
   wherein the aerospace plane is configured to accelerate in a first orientation and configured to glide and land in a second orientation, wherein the second orientation is substantially a reverse of the first orientation; and
   wherein the aerospace plane forms a hyper foil when traveling in the first orientation and a para foil when traveling in the second orientation.

8. The reversible aerospace plane of claim 7, further comprising a nose cone at the first end of the aerospace plane.

9. The reversible aerospace plane of claim 8, further comprising a nose cone heat exchanger disposed in the nose cone and configured to precool incident air.

10. The reversible aerospace plane of claim 8, wherein the nose cone is configured to be jettisoned before a re-entry.

11. The reversible aerospace plane of claim 7, wherein the engine comprises a bell nozzle engine configured to be jettisoned before a re-entry.

12. The reversible aerospace plane of claim 7, wherein the engine comprises an aerospike engine.

13. A reversible aerospace plane, comprising:
an intake to receive air at a first end of the aerospace plane;
an engine at a second end of the aerospace plane,
at least one heat exchanger disposed in the aerospace plane;
a first stage of the heat exchanger configured to condense the received air though the expansion of tanked hydrogen;
a second stage of the heat exchanger configured to condense the received air through the expansion of oxygen separated from air condensed in the first stage; and
an intake heat exchanger to cool the received air through the expansion of nitrogen separated from air condensed in the first stage; and
wherein the engine is configured to combust hydrogen expanded in the first stage and oxygen expanded in the second stage.

14. The reversible aerospace plane of claim 13, wherein the aerospace plane is configured to accelerate in a first orientation and configured to glide and land in a second orientation, wherein the second orientation is substantially a reverse of the first orientation.

15. The reversible aerospace plane of claim 13, further comprising a third stage of the heat exchanger configured to condense the received air through the expansion of tanked hydrogen.

16. The reversible aerospace plane of claim 15, wherein the third stage is configured to condense the received air though further expansion of the hydrogen expanded in the first stage.

17. The reversible aerospace plane of claim 13, wherein the tanked hydrogen comprises liquid hydrogen.

18. The reversible aerospace plane of claim 13 wherein the engine comprises an aero spike engine.

* * * * *